United States Patent
Lavid Ben Lulu et al.

(10) Patent No.: US 11,933,695 B2
(45) Date of Patent: Mar. 19, 2024

(54) SYSTEM AND METHOD FOR DETECTING ANOMALIES IN SENSORY DATA OF INDUSTRIAL MACHINES LOCATED WITHIN A PREDETERMINED PROXIMITY

(71) Applicant: Presenso, Ltd., Haifa (IL)

(72) Inventors: David Lavid Ben Lulu, Yokneam Illit (IL); Nir Dromi, Nahalal (IL); Aleksandr Tolstov, Saint Petersburg (RU); Ilia Sergeevich Smyshliaev, Saint Petersburg (RU)

(73) Assignee: AKTIEBOLAGET SKF, Gothenburg (SE)

( * ) Notice: Subject to any disclaimer, the term of this patent is extended or adjusted under 35 U.S.C. 154(b) by 94 days.

(21) Appl. No.: 16/717,207

(22) Filed: Dec. 17, 2019

(65) Prior Publication Data

US 2020/0209111 A1   Jul. 2, 2020

Related U.S. Application Data

(60) Provisional application No. 62/785,017, filed on Dec. 26, 2018.

(51) Int. Cl.
*G01M 99/00* (2011.01)
*G06N 20/00* (2019.01)

(52) U.S. Cl.
CPC .......... *G01M 99/005* (2013.01); *G06N 20/00* (2019.01)

(58) Field of Classification Search
CPC .... G01M 99/005; G01M 15/14; G01M 13/00; G06N 20/00; G06N 3/088
See application file for complete search history.

(56) References Cited

U.S. PATENT DOCUMENTS

| | | |
|---|---|---|
| 6,983,210 B2 | 1/2006 | Matsubayashi et al. |
| 6,993,417 B2 | 1/2006 | Osann |
| 7,276,915 B1 | 10/2007 | Euler et al. |
| 7,317,404 B2 | 1/2008 | Cumeralto et al. |
| 7,346,433 B2 | 3/2008 | Budike |
| 7,423,546 B1 | 9/2008 | Aisa |
| 7,451,017 B2 | 11/2008 | McNally |
| 7,460,930 B1 | 12/2008 | Howell et al. |
| 7,463,986 B2 | 12/2008 | Hayes |
| 7,605,698 B2 | 10/2009 | Moriwaki |

(Continued)

FOREIGN PATENT DOCUMENTS

| | | | | |
|---|---|---|---|---|
| CN | 108417261 A | * | 8/2018 | ......... F16K 37/0083 |
| JP | 2020048616 A | * | 4/2020 | |

(Continued)

*Primary Examiner* — Douglas Kay
(74) *Attorney, Agent, or Firm* — M&B IP Analysts, LLC.

(57) ABSTRACT

A system and computer-implemented method for detecting anomalies in industrial machine sensor data, including: computing, based on a received suspected anomalous level value of a sensory input data of each of the a plurality of sensory input data of a plurality of industrial machines that are located within a predetermined proximity, an average anomalous amount that is associated with at least a time interval; and determining that at least one of the plurality of suspected anomalies is an anomaly when a result of a subtraction of the computed average anomalous amount from each suspected anomalous level value of the plurality of sensory input data exceeds a predetermined threshold.

18 Claims, 5 Drawing Sheets

(56) References Cited

U.S. PATENT DOCUMENTS

| | | |
|---|---|---|
| 7,840,383 B2 | 11/2010 | Wang |
| 8,255,090 B2 | 8/2012 | Frader-Thompson et al. |
| 8,468,380 B2 | 6/2013 | Munjal et al. |
| 8,515,711 B2 | 8/2013 | Mitchell et al. |
| 8,644,166 B2 | 2/2014 | Xia et al. |
| 8,649,987 B2 | 2/2014 | Steenberg et al. |
| 8,665,061 B2 | 3/2014 | Kagan et al. |
| 9,074,348 B2 | 7/2015 | Suzuki et al. |
| 9,678,845 B2 | 6/2017 | Suzuki et al. |
| 10,692,004 B1* | 6/2020 | Segev .................. G06N 3/08 |
| 10,997,135 B2* | 5/2021 | Zoll .................... G06F 18/214 |
| 11,049,004 B1* | 6/2021 | Segev .................. G06N 3/084 |
| 2009/0030752 A1* | 1/2009 | Senturk-Doganaksoy .................. G06Q 50/06 705/7.41 |
| 2014/0058615 A1 | 2/2014 | Hatch et al. |
| 2017/0031329 A1* | 2/2017 | Inagaki ................ B25J 9/163 |
| 2017/0343451 A1* | 11/2017 | Yoshida ................ G01H 17/00 |
| 2017/0364818 A1* | 12/2017 | Wu ...................... G06F 11/3006 |
| 2018/0083833 A1* | 3/2018 | Zoll ...................... G06F 18/214 |
| 2018/0293125 A1* | 10/2018 | Lavid Ben Lulu .. G05B 23/024 |
| 2018/0293516 A1* | 10/2018 | Lavid Ben Lulu ...... G07C 3/00 |
| 2018/0307218 A1* | 10/2018 | Lavid Ben Lulu .... G06N 20/00 |
| 2018/0348747 A1* | 12/2018 | Lavid Ben Lulu .. G05B 13/048 |
| 2018/0357292 A1* | 12/2018 | Rai ..................... G06F 16/2455 |
| 2018/0357556 A1* | 12/2018 | Rai ........................ G06N 20/00 |
| 2018/0357595 A1* | 12/2018 | Rai ..................... G06Q 10/087 |
| 2018/0366979 A1* | 12/2018 | Granger ................ H02J 3/381 |

FOREIGN PATENT DOCUMENTS

| | | | |
|---|---|---|---|
| WO | WO-2017116627 A1 * | 7/2017 | .......... G05B 19/418 |
| WO | WO-2017120579 A1 * | 7/2017 | .......... G05B 13/027 |
| WO | WO-2017127260 A1 * | 7/2017 | ............ G05B 13/04 |
| WO | WO-2017139046 A1 * | 8/2017 | .......... G05B 13/048 |

* cited by examiner

SYSTEM AND METHOD FOR DETECTING ANOMALIES IN SENSORY DATA OF INDUSTRIAL MACHINES LOCATED WITHIN A PREDETERMINED PROXIMITY

CROSS-REFERENCE TO RELATED APPLICATIONS

This application claims the benefit of U.S. Provisional Application No. 62/785,017 filed on Dec. 26, 2018, the contents of which are hereby incorporated by reference.

TECHNICAL FIELD

The present disclosure relates generally to maintenance systems for machines, and more specifically to detecting anomalies in sensory input data received from industrial machines.

BACKGROUND

Communications, processing, cloud computing, artificial intelligence, and other computerized technologies have advanced significantly in recent years, heralding in new fields of technology and production. Notwithstanding these improvements, many of the industrial technologies employed since or before the 1970s remain in use today. Existing solutions related to these industrial technologies have typically seen minor improvements, thereby increasing production and yield only slightly.

In modern manufacturing practices, manufacturers must often meet strict production timelines and provide flawless or nearly flawless production quality. As a result, these manufacturers risk heavy losses whenever an unexpected machine failure occurs. A machine failure is an event that occurs, when a machine deviates from correct service. Errors, which are typically deviations from the correct state of the machine, are not necessarily failures, but may lead to and indicate potential future failures. Aside from failures, errors may otherwise cause unusual machine behavior that may affect performance.

The average failure-based machine downtime for typical manufacturers (i.e., the average amount of time in which production shuts down, either in part or in whole, due to machine failure) is 17 days per year, i.e., 17 days of lost production and, hence revenue. In the case of a typical 450-megawatt power turbine, for example, a single day of downtime can cost a manufacturer over $3 million US in lost revenue. Such downtime may incur additional costs related to repair, safety precautions, and the like.

In energy power plants, billions of US dollars are spent annually on ensuring reliability. Specifically, billions of dollars are spent on backup systems and redundancies to minimize production downtimes. Additionally, monitoring systems may be used to identify failures quickly, thereby speeding up a return to production when downtime occurs. However, existing monitoring systems typically identify failures only after, during, or immediately before downtime begins.

Further, existing solutions for monitoring machine failures typically rely on a set of predetermined rules for each machine. These rule sets do not account for all data that may be collected with respect to the machine, and may only be used for checking particular key parameters while ignoring the rest. Moreover, these rule sets are configured in advance by engineers or other human analysts. As a result, only some of the collected data may be actually used by existing solutions, thereby resulting in wasted use of computing resources related to transmission, storage, and processing of unused data. Further, failure to consider all relevant data may result in missed or otherwise inaccurate determination of failures.

Additionally, existing solutions often rely on periodic testing at predetermined intervals. Thus, even existing solutions that can predict failures in advance typically return requests to perform machine maintenance even when the machine is not in immediate danger of failing. Such premature replacement results in wasted materials and expenses spent replacing parts that are still functioning properly. Further, such existing solutions often determine failures only after a failure occurs. As a result, such failures may not be prevented, resulting in downtime and lost revenue.

Furthermore, existing monitoring and maintenance solutions often require dedicated testing equipment. Consequently, these solutions typically require specialized operators who are well-trained in the operation of each monitoring and maintenance system. Requiring specialized operators can be inconvenient and costly and may introduce potential sources of human error. Given the sheer amount of data that may be collected for any given machine in addition to minute fluctuations in data, a human analyst is often not capable of adequately determining upcoming failures.

Lastly, existing solutions present techniques by which anomalies are identified and corrective solution recommendations are generated and provided. The corrective solution recommendations are usually sent to a user device associated with a user responsible for maintaining the machine. Therefore, although the process of identifying a suboptimal operation of a machine may be performed automatically, repairing an identified suboptimal operation of a machine is still performed manually. This is inefficient, time-consuming, and labor-intensive.

Additionally, selecting the most suitable corrective action, from a variety of possible actions, can be a challenge. Basing such a decision on an identified pattern that may indicate an upcoming machine failure leaves no place for human error, saving precious time when deciding which solution would be best for a particular pattern that is associated with a particular failure. Currently, even when such predictions of upcoming machine failures are available, there is no solution that suggests selecting a corrective solution based on a specific identified pattern.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a computer-implemented method for detecting anomalies in industrial machine sensor data, including: computing, based on a received suspected anomalous level value of a sensory input data of each of the a plurality of sensory input data of a plurality of industrial machines that are located within a predetermined proximity, an average anomalous amount that is associated with at least a time interval; and determining that at least one of the plurality of suspected anomalies is an anomaly when a result of a subtraction of the computed average anomalous amount from each suspected anomalous level value of the plurality of sensory input data exceeds a predetermined threshold.

Certain embodiments disclosed herein also include a non-transitory computer readable medium having stored thereon instructions for causing a processing circuitry to perform a process, the process including: computing, based on a received suspected anomalous level value of a sensory input data of each of the a plurality of sensory input data of a plurality of industrial machines that are located within a predetermined proximity, an average anomalous amount that is associated with at least a time interval; and determining that at least one of the plurality of suspected anomalies is an anomaly when a result of a subtraction of the computed average anomalous amount from each suspected anomalous level value of the plurality of sensory input data exceeds a predetermined threshold.

Certain embodiments disclosed herein also include a system for identifying and repairing suboptimal operation of a machine, including: a processing circuitry; and a memory, the memory containing instructions that, when executed by the processing circuitry, configure the system to: compute, based on a received suspected anomalous level value of a sensory input data of each of the a plurality of sensory input data of a plurality of industrial machines that are located within a predetermined proximity, an average anomalous amount that is associated with at least a time interval; and determine that at least one of the plurality of suspected anomalies is an anomaly when a result of a subtraction of the computed average anomalous amount from each suspected anomalous level value of the plurality of sensory input data exceeds a predetermined threshold.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
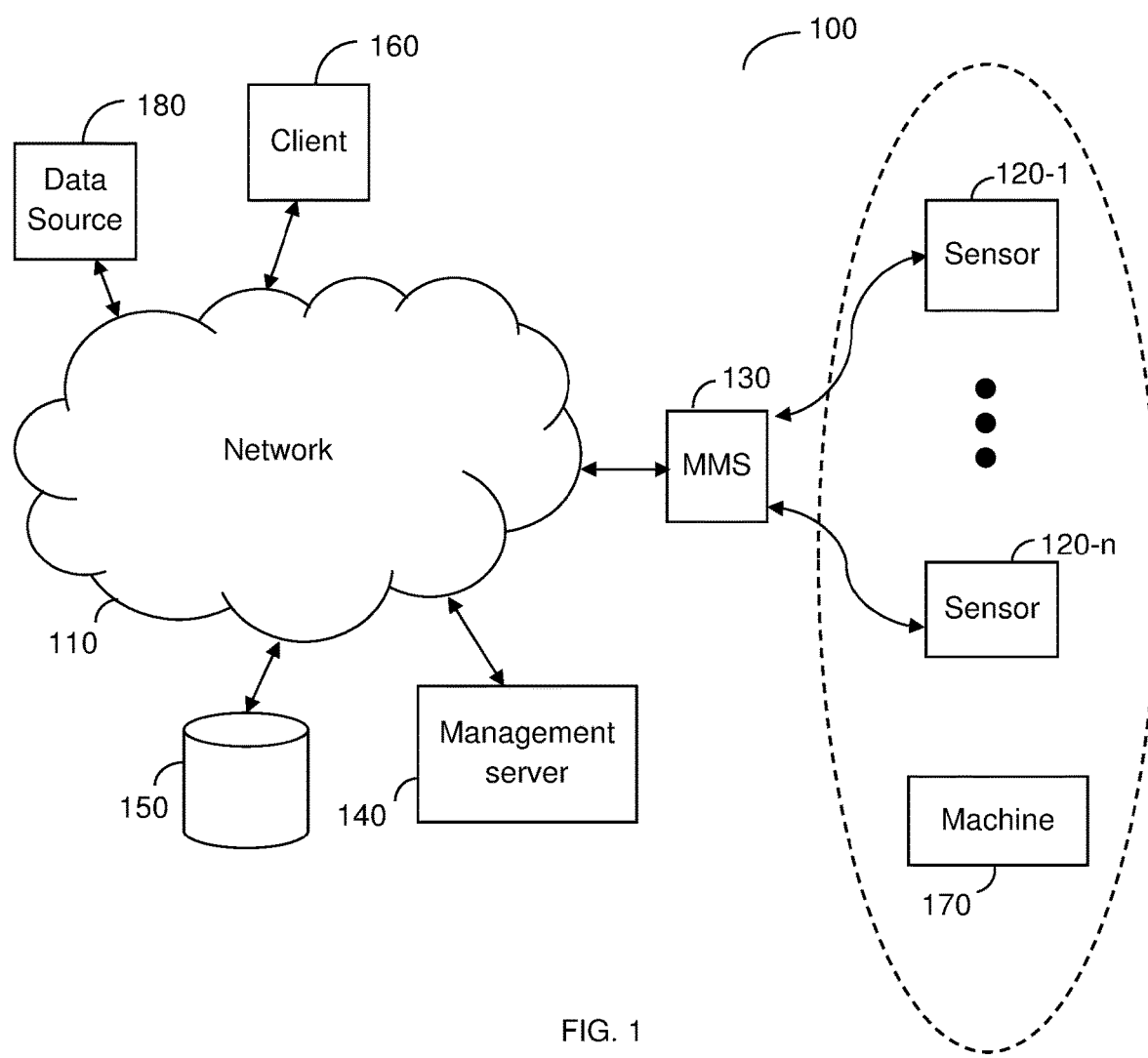
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By monitoring time stamped sensory input data that are related to a plurality of machines that are located in a predetermined proximity, a plurality of suspected anomalies of the plurality of sensory input data are identified in a time interval. Each suspected anomaly includes a suspected anomalous level value. An average anomalous amount of the plurality suspected anomalous level values that is associated with the time interval is calculated. Then, by subtracting the calculated average anomalous amount from each suspected anomalous level value of the plurality of sensory input data, it is determining whether at least one of the suspected anomalies is an anomaly or a reasonable machine behavior. In an embodiment, the average anomalous amount is a mean, a median, a standard deviation, and similar calculations of average sensor values that exceed a predetermined baseline value.

FIG. 1 is an example network diagram 100 utilized to describe the various disclosed embodiments. The example network diagram 100 includes a machine monitoring system (MMS) 130, a management server 140, a database 150, a client device 160, and a data source 180 connected through a network 110. The example network diagram 100 further includes a plurality of sensors 120-1 through 120-n (hereinafter referred to individually as a sensor 120 and collectively as sensors 120, merely for simplicity purposes, where n is an integer equal to or greater than 1), connected to the MMS 130. The network 110 may be, but is not limited to, a wireless, a cellular or wired network, a local area network (LAN), a wide area network (WAN), a metro area network (MAN), the Internet, the worldwide web (WWW), similar networks, and any combination thereof.

The client device 160 may be, but is not limited to, a personal computer, a laptop, a tablet computer, a smartphone, a wearable computing device, or any other device capable of receiving and displaying notifications indicating maintenance and failure timing predictions, corrective solution recommendations, results of supervised analysis, unsupervised analysis of machine operation data, or both, and the like.

The sensors 120 are located in proximity (e.g., physical proximity) to a machine 170, such as an industrial machine. The machine 170 may be any machine for which performance can be represented via sensory input data such as, but not limited to, a turbine, an engine, a welding machine, a three-dimensional (3D) printer, an injection molding machine, a combination thereof, a portion thereof, and the like. Each sensor 120 is configured to collect sensory input data such as, but not limited to, sound signals, ultrasound signals, light, movement tracking indicators, temperature, energy consumption indicators, and the like based on operation of the machine 170. The sensors 120 may include, but are not limited to, sound capturing sensors, motion tracking sensors, energy consumption meters, temperature meters, and the like. Any of the sensors 120 may be connected communicatively or otherwise to the machine 170 (such connection is not illustrated in FIG. 1 merely for the sake of simplicity and without limitation on the disclosed embodiments). It should be noted that multiple machines, such as the machine 170, may be connected via the network 110 to the management server 140.

The data source 180 may be a server, a data warehouse, a website, a cloud database, and the like. The data source 180 may be configured to store machine historical data collected from a plurality of sensors, e.g. the sensors 120, associated with one or more machines, e.g., the machine 170. The historical data may be indicative of anomalous sensory input data inputs and anomalous machine behavior, normal sensory input data inputs and normal machine behavior, normal and anomalous patterns, anomalous sensory input data inputs sequences, and the like.

The sensors 120 are connected to the MMS 130. In an embodiment, the MMS 130 is configured to store and preprocess raw sensory input data received from the sensors 120. Alternatively, or collectively, the MMS 130 may be configured to periodically retrieve collected sensory input data stored in, for example, the database 150. The preprocessing may include, but is not limited to, data cleansing, normalization, rescaling, re-trending, reformatting, noise filtering, a combination thereof, and the like.

The preprocessing may further include feature extraction. In an embodiment, the results of the feature extraction include features to be utilized by the management server 140 during unsupervised machine learning in order to detect indicators. The feature extraction may include, but is not limited to, dimension reduction techniques such as, but not limited to, singular value decompositions, discrete Fourier transformations, discrete wavelet transformations, line segment methods, or a combination thereof. When such dimension reduction techniques are utilized, the preprocessing may result in a lower dimensional space for the sensory input data. The machine monitoring system 130 is configured to send the preprocessed sensory input data to the management server 140.

In an embodiment, the management server 140 is configured to receive, through the network 110, the preprocessed sensory input data associated with the machine 170 from the machine monitoring system 130. The sensory input data may be received continuously and may be received in real-time. In an embodiment, the management server 140 is configured to store the sensory input data received from the machine monitoring system 130. Alternatively, or collectively, the sensory input data may be stored in the database 150. The database 150 may further store sensory input data (raw, preprocessed, or both) collected from a plurality of other sensors (not shown) associated with other machines (also not shown). The database 150 may further store indicators, anomalous patterns, failure predictions, behavioral models utilized for analyzing sensory input data, or a combination thereof.

The management server 140, typically comprising at least a processing circuitry (not shown) and a memory (not shown), the memory contains therein instructions that when executed by the processing circuitry configure the management server 140 as further described herein below.

In an embodiment, the management server 140 is configured to monitor a plurality of time stamped sensory input data related to a plurality of machines, e.g., the machine 170, that are located in a predetermined proximity. The plurality of machines may be related to the same type of machine, e.g., all the monitored machines may be a specific type of industrial machine, such as a turbine. The plurality of machines may include, for example, a fleet of ten turbines. The predetermined proximity may be for example a square mile at which twenty turbines are located. The predetermined proximity may be previously entered, e.g., into the database 150, to facilitate the management server 140 operation. The monitoring process of the plurality of time stamped sensory input data may include, for example, tracking and aggregating a plurality of parameters associated with the sensory input data that are related to several machine components, in real-time or near real-time. The monitoring may be performed constantly and may further be performed by the machine monitoring system 130. The monitored sensory input data may include data that is indicative of the operation of at least one component of the plurality of machines. For example, the monitored sensory input data may include a temperature value, a speed value of one or more gears, vibration intensity, and the like.

In an embodiment, the management server 140 is configured to identify, in at least a time interval corresponding to the plurality of time stamped sensory input data, a plurality of suspected anomalies of the plurality of sensory input data. The time interval may be, for example, a time pointer at which the management server 140 sampled a sample of the monitored sensory input data, at which the suspected anomalies of the plurality of sensory input data were identified. That is, the plurality of suspected anomalies of the plurality of sensory input data that were identified in the time interval occurred at the same time or approximately the same time. Each sensory input of the plurality of sensory input data includes a suspected anomalous level value. The suspected anomalous level value may be represented by, for example, a number between 0-100.

In an embodiment, a suspected anomaly may be represented by a sensory input that differs from a plurality of sensory input data of the same type. In an embodiment, a difference of a sensory input value from an expected baseline beyond a predetermined threshold establishes the value as a suspected anomaly. For example, in case an average temperature of a machine is 90 degrees, a temperature of 110 degrees may be considered as suspected anomaly when the change is very fast and occurs within seconds. The identification of the plurality of suspected anomalies may be achieved by, but is not limited to, unsupervised machine learning. In a further embodiment, the unsupervised machine learning may include one or more signal processing techniques, implementation of one or more neural networks, recurrent neural networks, decision tree learning, Bayesian networks, clustering, and the like. It should be noted that different parameters represented by the sensory input data may be analyzed using different machine learning techniques. For example, a temperature parameter may be analyzed by applying a first machine learning technique to sensory input data from a temperature sensor, and an energy consumption parameter may be analyzed by applying a second machine learning technique to sensory input data from an energy consumption gauge.

In an embodiment, the management server 140 may be configured to automatically select at least one optimal method for detecting indicators in the sensory input data based on, e.g., a type of one or more portions of the data. An indicator is a data point that exceeds a maximum threshold, or falls below a minimum threshold, indicating the presence of a suspected anomaly. In a further embodiment, the selection may be based on results from applying a plurality of models to each of at least a portion of the sensory input data. In yet a further embodiment, the selection may be based further on false positive and true positive rates.

In a further embodiment, the management server 140 is configured to generate a meta-model based on at least one portion of the machine 170. Each portion of the machine for which a meta-model is generated may be a component (not shown) such as, but not limited to, a pipe, an engine, a portion of an engine, a combination thereof, and the like.

Generating a meta-model may include, but is not limited to, selecting a model that optimally indicates anomalies in the sensory input data for each of the at least one portion of the machine 170. Each of the generated meta-models is utilized to detect anomalies in the behavior of the respective portion of the machine 170.

In an embodiment, the management server 140 is configured to generate, in real-time, at least one adaptive threshold for detecting anomalies based on the analysis. In a further embodiment, the management server 140 is configured to determine, in real-time or near real-time, normal machine behavioral patterns based on the sensory input data of the machine 170 or each portion thereof. The adaptive thresholds may be generated based on the determined normal behavior patterns. Generation of adaptive thresholds for detecting anomalies based on normal behavior patterns is described further herein below with respect to FIGS. 3A and 3B.

In an embodiment, the management server 140 may be configured to determine based on the at least one machine behavioral pattern and the monitored sensory input data, at least one machine failure prediction. The at least one machine failure prediction may be a prediction of failure of the machine or of any portion thereof (e.g., a component of the machine). In an embodiment, the failures are predicted based on similar patterns of, e.g., anomalies.

In an embodiment, the management server 140 is configured to calculate an average anomalous amount, that is associated with the at least a time interval, based on the suspected anomalous level value of each sensory input of the plurality of sensory input data of the plurality of machines. For example, three sensory input data of three single sensor machines that are located in a predetermined proximity, are monitored and thus three suspected anomalies are identified. The suspected anomalous level value of the first machine is 0, the suspected anomalous level value of the second machine is 2, and the suspected anomalous level value of third machine is 7. Therefore, the average anomalous amount is 3. It should be noted that there may be multiple average anomalous amounts for different time intervals at which a plurality of sensory input data is sampled and new suspected anomalies may be identified.

In an embodiment, the management server 140 is configured to determine that at least one of the plurality of suspected anomalies is an anomaly when the result of subtracting the calculated average anomalous amount from each suspected anomalous level value of the plurality of sensory input data is larger than a predetermined threshold. In an embodiment, the calculation is executed using absolute values of both the calculated average anomalous amount and each of the suspected anomalous level values. In a further embodiment, the predetermined threshold is zero. For example, three sensory input data of three single sensor machines that are located in a predetermined proximity, are monitored and thus three suspected anomalies are identified. The suspected anomalous level value of the first machine is 100, the suspected anomalous level value of the second machine is 100, and the suspected anomalous level value of third machine is 100. Therefore, the average anomalous amount is 100. According to the same example, by reducing the calculated average anomalous amount from each of the suspected anomalous level values, the results will be zero for the first machine, zero for the second machine, and zero for the third machine. That is, no anomalies were identified.

According to another non-limiting example, the average anomalous amount of 40 machines that are located in predetermined proximity is 120 and only three machines of the 40 machines have positive values above zero, e.g., values of one (1), four (4) and two (2), that are indicative of an abnormal machine behavior. It should be noted that in certain embodiment, because the positive values indicated in the example are relatively low, they are therefore considered to indicate only minor suboptimal operation of the machine.

It should be noted that the management server 140 is configured to determine that at least one of the plurality of suspected anomalies is a reasonable behavior of at least one machine of the plurality of machines when the result of the reduction of the calculated average anomalous amount from each suspected anomalous level value of the plurality of sensory input data is equal or smaller than zero.

In an embodiment, the management server 140 is configured to generate, upon determination that an anomaly was identified, at least one notification that is indicative of the determined anomaly. The notification may include data related to the anomaly, suggested corrective solutions, time to machine failure, and so on. According to another embodiment, the notification may be sent to at least one device, e.g., the client device 160.

It should be noted that the plurality of sensory input data may be constantly monitored in order to identify new suspected anomalies in the plurality of sensory input data. That is, the method described herein above and below may be performed constantly.

It should be noted that the machine monitoring system 130 is shown in FIG. 1 as a separate component from the management server 140 merely for simplicity purposes and without limitation on the disclosed embodiments. The machine monitoring system 130 may be incorporated in the management server 140 so as to allow the management server 140 to obtain and preprocess sensory input data without departing from the scope of the disclosure.

It should also be noted that the embodiments described herein above with respect to FIG. 1 are discussed with respect to a client device 160 and a machine 170 merely for simplicity purposes and without limitation on the disclosed embodiments. Multiple client devices may receive information related to machine maintenance and failures without departing from the scope of the disclosure. Additionally, sensory input data related to multiple machines may be collected to determine failures of any or all of the machines without departing from the scope of the disclosure.

It should be further noted that the embodiments disclosed herein are not limited to the specific architecture illustrated in FIG. 1 and other architectures may be equally used without departing from the scope of the disclosed embodiments. Specifically, the management server 140 may reside in a cloud computing platform, a datacenter, on premise, and the like. Moreover, in an embodiment, there may be a plurality of management servers operating as described hereinabove and configured to either have one as a standby proxy to take control in a case of failure, to share the load between them, or to split the functions between them.

The management server 140 is configured to normalize values of sensory input data that are monitored in real-time, near real-time, or even after a predetermined time interval, in order to enhance prediction capabilities of suboptimal machine operation. There are several machine features that may be affected by, for example, environmental variables. The values of the sensory input data that indicate on these machine features may be accidentally identified as abnormal machine behaviors that are indicative of, e.g., a machine failure, while in fact, the machine behavior is actually reasonable when taking into account a plurality of sensors from the same kind of several machines that are located in a predetermined proximity. For example, when a strong gust of wind blows and only one machine is monitored, the speed of a rotor of a turbine may be significantly increased and therefore it may be identified as an abnormal machine behavior. However, when the speed of ten rotors of ten turbines that are located in a predetermined proximity are monitored, the increased speed of the ten rotors is identified as a reasonable machine behavior.

Figure 2:
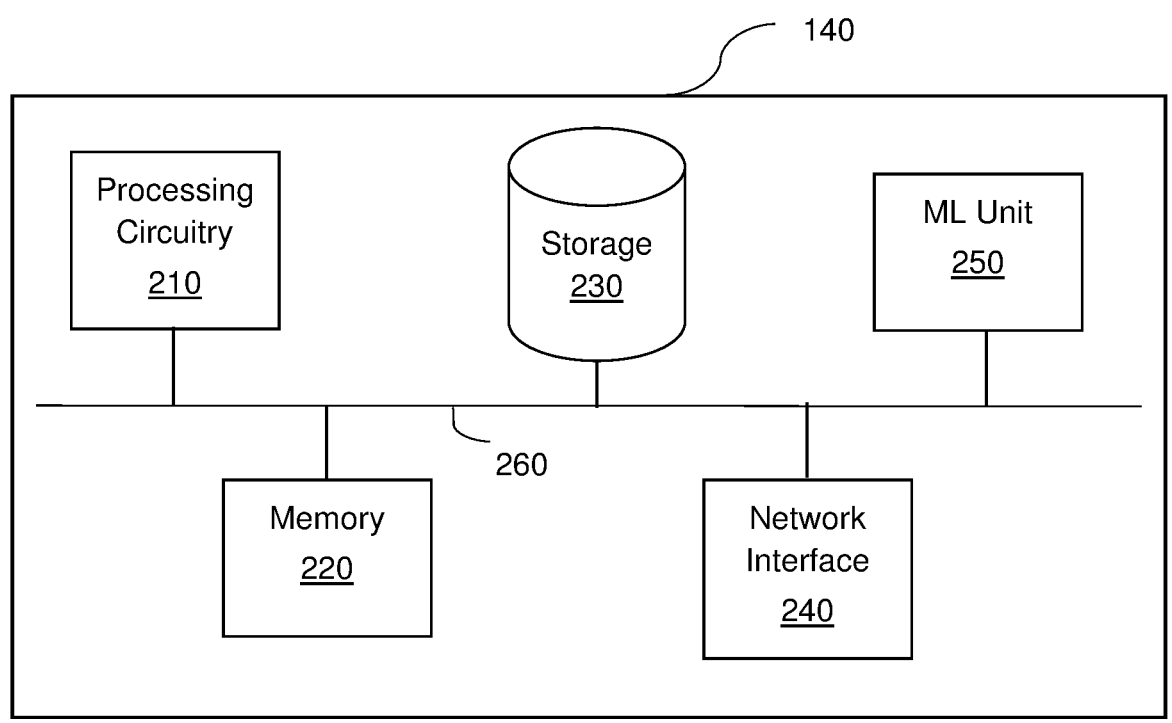
FIG. 2 is a block diagram of a management server according to an embodiment.

FIG. 2 shows an example block diagram of the management server 140 implemented according to one embodiment. The management server 140 includes a processing circuitry 210 coupled to a memory 220, a storage 230, a network interface 240, and a machine learning (ML) unit 250. In an embodiment, the components of the management server 140 may be connected via a bus 260.

The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, and the like), non-volatile (e.g., ROM, flash memory, and the like), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. In an embodiment, the memory 220 may contain data collected by the sensors, e.g., the sensors 120 of FIG. 1. In a further embodiment, such data may also be stored in a data warehouse such as the database.

The storage 230 may be magnetic storage, optical storage, and the like, and may be realized, for example, as flash memory or other memory technology, CD-ROM, Digital Versatile Disks (DVDs), or any other medium which can be used to store the desired information.

The network interface 240 allows the management server 140 to communicate with the machine monitoring system 130 for the purpose of, for example, receiving raw and/or preprocessed sensory input data. Additionally, the network interface 240 allows the management server 140 to communicate with the client device 160 in order to send, e.g., notifications related to anomalous activity, machine suboptimal operation, machine failure prediction, corrective solution recommendations, corrective actions, and the like.

The machine learning unit 250 is configured to perform machine learning based on sensory input data received via the network interface 240 as described further herein. In an embodiment, the machine learning unit 250 is further configured to determine, based on one or more machine learning models, predictions for failures of a machine, e.g., the machine 170. In a further embodiment, the machine learning unit 250 is also configured to determine at least one recommendation for avoiding or mitigating the determined predicted failures. As a non-limiting example, the at least one recommendation may indicate that an exhaust pipe on the machine 170 should be replaced with a new exhaust pipe to avoid failure. The machine learning model may be utilized for detecting anomalies in sensory input data received from machines that are located in a predetermined proximity as further described herein above and below.

It should be understood that the embodiments described herein are not limited to the specific architecture illustrated in FIG. 2, and other architectures may be equally used without departing from the scope of the disclosed embodiments.

Figure 3A:
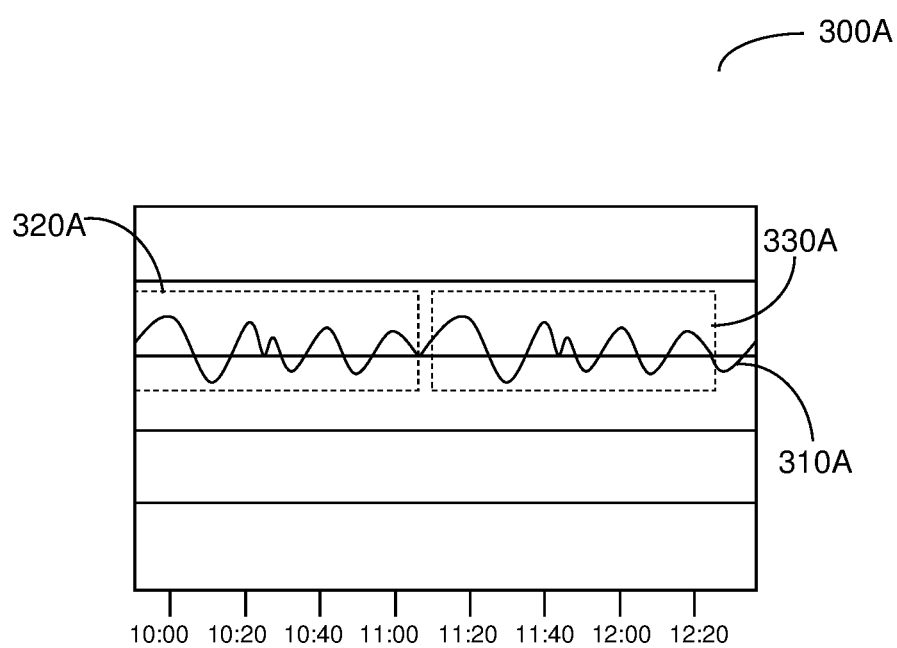
FIG. 3A simulates representation of a first pattern of normal sensory input behavior according to an embodiment.

FIG. 3A is an example representation of behavioral patterns implemented according to an embodiment. The representation shown in FIG. 3A includes a graph 300A in which sensory input data are represented by a curve 310A. In the example simulation shown in FIG. 3A, the curve 310A represents an aggregated behavior of the sensory input data over time. During operation of a machine (e.g., the machine 170, FIG. 1), the aggregated behavior represented by the curve 310A may be continuously monitored for repeated sequences such as repeated sequences 320A and 330A. Upon determination of, for example, the repeated sequence 320A, the repeated sequence 330A, or both, a model of a normal behavior pattern of the machine is generated.

It should be noted that continuous monitoring of two or more cycles of behavior may be useful for determining more accurate patterns. As monitoring and, consequently, learning, continue, the normal behavior model may be updated accordingly. The models of normal behavior patterns may be utilized to determine anomalies and machine failure predictions. As a non-limiting example, if the sequence 320A preceded a machine failure or other suboptimal operation of a machine, then the determination of repeated sequence 330A may be predicted to precede a machine failure or the other suboptimal operation of a machine.

Figure 3B:
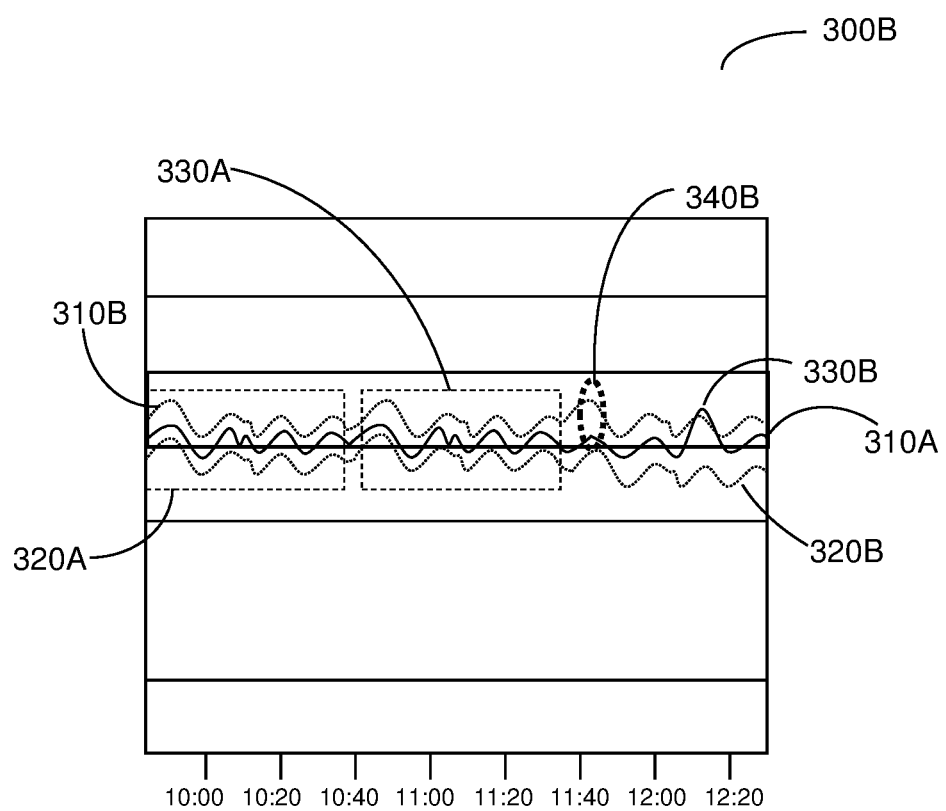
FIG. 3B simulates representation of a second pattern of an anomalous sensory input behavior according to an embodiment.

FIG. 3B is an example representation 300B illustrating generation of adaptive thresholds. Based on one or more repeated sequences (e.g., the repeated sequences 320A and 330A), a maximum threshold 310B and a minimum threshold 320B are determined. The thresholds 310B and 320B may be determined in real-time and regardless of past machine behavior. In an example implementation, the thresholds 310B and 320B are dynamic and adapted based on the sequences 320A and 330A as well as any subsequently determined sequences. The point 330B represents an indicator, i.e., a data point that is above the maximum threshold 310B or below the minimum threshold 320B. Upon determination that one of the thresholds 310B or 320B has been exceeded, an anomaly may be detected. In an embodiment, an anomaly is indicative of a suboptimal operation of the machine.

Figure 4:
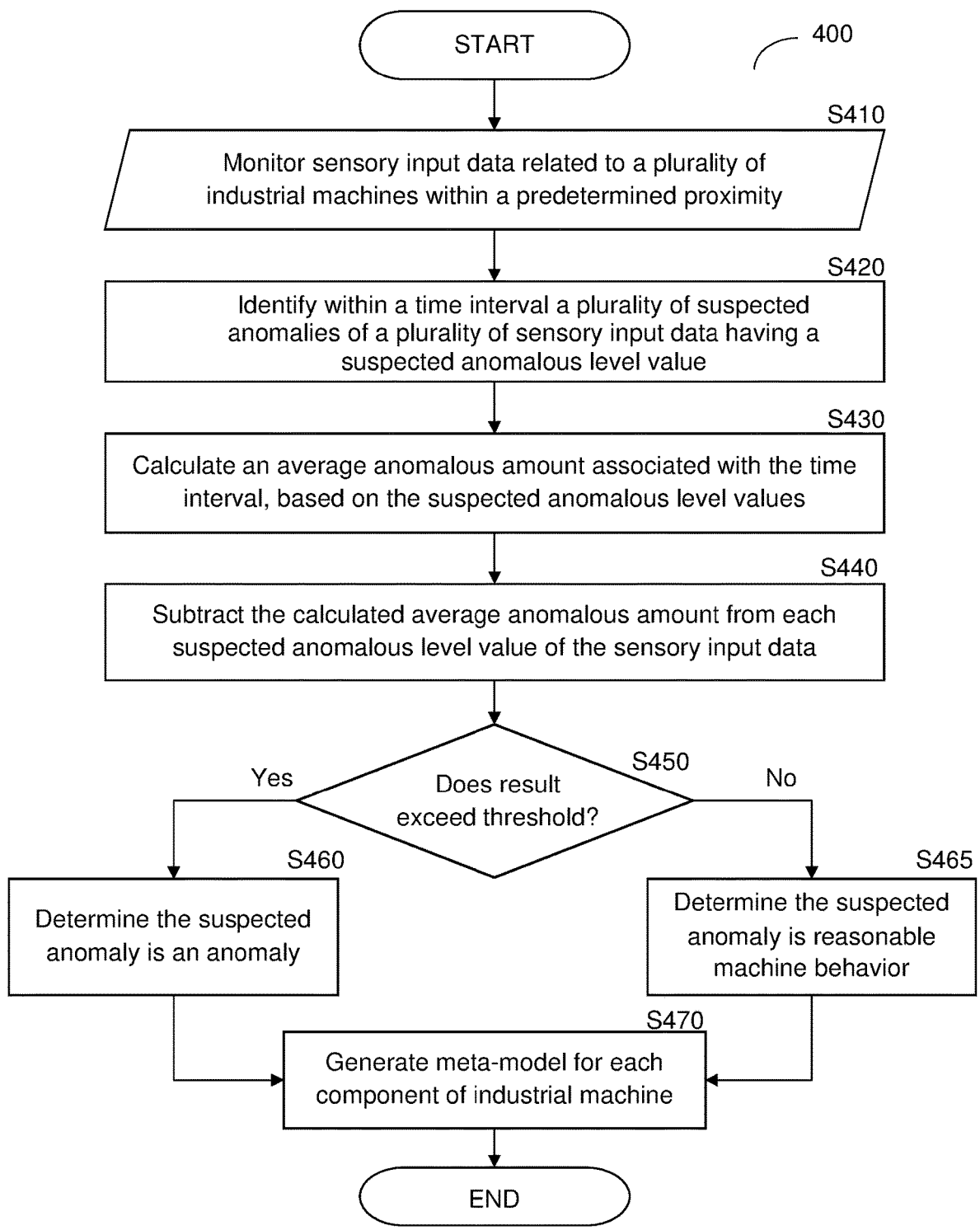
FIG. 4 is a flowchart illustrating a method for detecting anomalies in sensory input data received from industrial machines located in a predetermined proximity according to an embodiment.

FIG. 4 is an example flowchart 400 illustrating a method for detecting anomalies in sensory input data received from industrial machines that are located in a predetermined proximity, according to an embodiment.

At S410, a plurality of sensory input data related to a plurality of machines that are located in the predetermined proximity is monitored over a predetermined time interval. In an embodiment, the sensory input data is time stamped to identify the data as originating from that predetermined time interval. The sensory input data may include for example sound signals, ultrasound signals, light, movement tracking indicators, temperature, energy consumption indicators, and the like based on operation of a machine, e.g., the machine 170.

At S420, a plurality of suspected anomalies of the plurality of sensory input data is identified within a time interval corresponding to the plurality of time stamped sensory input data. Each sensory input of the plurality of sensory input data includes a suspected anomalous level value. In an embodiment, the identification of the plurality of suspected anomalies may be achieved by unsupervised machine learning. The unsupervised machine learning may include one or more signal processing techniques, implementation of one or more neural networks, recurrent neural networks, decision tree learning, Bayesian networks, clustering, and the like. In a further embodiment, the suspected anomalies are calculated externally and received as an input.

At S430, an average anomalous amount that is associated with the time interval is computed based on the suspected anomalous level value of each sensory input of the plurality of sensory input data of the plurality of machines.

At S440, the computed average anomalous amount is subtracted from each suspected anomalous level value of the plurality of sensory input data.

At S450 it is checked whether the result of the subtraction exceeds the predetermined threshold, e.g., is larger than zero and if so, execution continues with S460; otherwise, execution continues with S465.

At S460, the suspected anomaly is determined to be an anomaly. For example, when the result of the reduction, described in S440, is larger than zero, e.g., 1, 12, 70, and so on, the positive value is indicative of an abnormal machine behavior.

At S465 the suspected anomaly is determined to be a reasonable machine behavior.

The reasonable machine behavior determination may indicate that a suspected anomaly or suspected anomalies have occurred due to acceptable reasons, such as, for example, environmental variables that affected the operation of the machine. Example for variables include a strong gust of wind against a wind turbine. It should be noted that these suspected anomalies determined to be reasonable machine behavior do not indicate on a suboptimal operation of the machine, nor a machine fault, a machine failure, a forthcoming machine failure, and the like.

At optional S470, a meta-model is generated for at least one portion of the industrial machine based on the determination of anomalous or reasonable machine behavior. Each portion of the machine for which a meta-model is generated may be a component such as, but not limited to, a pipe, an engine, a portion of an engine, a combination thereof, and the like. Generating a meta-model may include, but is not limited to, selecting a model that optimally indicates anomalies in the sensory input data for each of the at least one portion of the machine. Each of the generated meta-models may then be utilized to detect future anomalies in the behavior of the respective portion of the industrial machine.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing circuitries ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer-implemented method for detecting anomalies in industrial machine sensor data, comprising:
monitoring sensory input data of a plurality of industrial machines of a same type that are located within a predetermined proximity of each other, wherein monitoring the sensory input data further comprises tracking and aggregating a plurality of parameters associated with the sensory input data with respect to respective components of a plurality of components of the plurality of industrial machines, wherein the sensory input data is collected via a plurality of sensors each located in a predetermined proximity to one of the plurality of industrial machines, wherein the sensory input data is indicative of an operation of the plurality of components of the plurality of industrial machines;
analyzing the plurality of parameters associated with the sensory input data using a plurality of machine learning techniques, wherein different parameters of the plurality of parameters are analyzed using different machine learning techniques of the plurality of machine learning techniques, wherein the plurality of machine learning techniques includes applying at least one of: a neural network, a recurrent neural network, decision tree learning, a Bayesian network, and clustering;
computing, based on a suspected anomalous level value of each of a plurality of suspected anomalies of the sensory input data of the plurality of industrial machines, an average anomalous amount that is associated with a time interval for each of the plurality of suspected anomalies, wherein each suspected anomaly is a portion of the sensory input data;
generating a plurality of meta-models, each meta-model being generated for one of the plurality of components, wherein the meta-model generated for each component optimally indicates anomalies in the sensory input data for the component;

determining that at least one of the plurality of suspected anomalies is an anomaly, wherein a suspected anomaly is determined to be an anomaly when a result of a subtraction of the computed average anomalous amount from the suspected anomalous level value for the at least one of the plurality of suspected anomalies exceeds a predetermined threshold, wherein each of the plurality of meta-models is utilized to detect at least a portion of the determined at least one anomaly in behavior of a respective portion of one of the plurality of industrial machines; and determining at least one predicted machine failure based on the at least one of the plurality of suspected anomalies determined to be an anomaly and the sensory input data of the plurality of industrial machines of the same type that are located within a predetermined proximity.

2. The computer-implemented method of claim 1, further comprising:

monitoring a plurality of time stamped sensory input data related to the plurality of industrial machines; and identifying, in the time interval corresponding to the plurality of time stamped sensory input data, the plurality of suspected anomalies of the sensory input data.

3. The computer-implemented method of claim 2, wherein the identification of the plurality of suspected anomalies is achieved by unsupervised machine learning.

4. The computer-implemented method of claim 1, further comprising:

generating, upon the determination that at least one of the plurality of suspected anomalies is an anomaly, a notification that is indicative of each determined anomaly.

5. The computer-implemented method of claim 1, further comprising:

determining that at least one of the plurality of suspected anomalies is a reasonable behavior of at least one industrial machine of the plurality of industrial machines when the result of the subtraction of the average anomalous amount from each suspected anomalous level value of the plurality of sensory input data is equal to or less than the predetermined threshold.

6. The computer-implemented method of claim 1, wherein the sensory input data is indicative of an operation of at least one component of the plurality of industrial machines.

7. The computer-implemented method of claim 1, further comprising:

preprocessing raw sensory input data received from a plurality of sensors configured to collect sensory input data based on operation of the plurality of industrial machines; and storing the preprocessed raw sensory input data in a data source.

8. The computer-implemented method of claim 7, wherein the preprocessing includes at least one of: data cleansing, normalization, rescaling, re-trending, reformatting, and noise filtering.

9. A non-transitory computer readable medium having stored thereon instructions for causing a processing circuitry to perform a process, the process comprising:

monitoring sensory input data of a plurality of industrial machines of a same type that are located within a predetermined proximity of each other, wherein monitoring the sensory input data further comprises tracking and aggregating a plurality of parameters associated with the sensory input data with respect to respective components of a plurality of components of the plurality of industrial machines, wherein the sensory input data is collected via a plurality of sensors each located in a predetermined proximity to one of the plurality of industrial machines, wherein the sensory input data is indicative of an operation of the plurality of components of the plurality of industrial machines;

analyzing the plurality of parameters associated with the sensory input data using a plurality of machine learning techniques, wherein different parameters of the plurality of parameters are analyzed using different machine learning techniques of the plurality of machine learning techniques, wherein the plurality of machine learning techniques includes applying at least one of: a neural network, a recurrent neural network, decision tree learning, a Bayesian network, and clustering;

computing, based on a suspected anomalous level value of each of a plurality of suspected anomalies of the sensory input data of the plurality of industrial machines, an average anomalous amount that is associated with a time interval for each of the plurality of suspected anomalies, wherein each suspected anomaly is a portion of the sensory input data;

generating a plurality of meta-models, each meta-model being generated for one of the plurality of components, wherein the meta-model generated for each component optimally indicates anomalies in the sensory input data for the component;

determining that at least one of the plurality of suspected anomalies is an anomaly, wherein a suspected anomaly is determined to be an anomaly when a result of a subtraction of the computed average anomalous amount from the suspected anomalous level value for the at least one of the plurality of suspected anomalies exceeds a predetermined threshold, wherein each of the plurality of meta-models is utilized to detect at least a portion of the determined at least one anomaly in behavior of a respective portion of one of the plurality of industrial machines; and determining at least one predicted machine failure based on the at least one of the plurality of suspected anomalies determined to be an anomaly and the sensory input data of the plurality of industrial machines of the same type that are located within a predetermined proximity.

10. A system for detecting anomalies in industrial machine sensor data, comprising:

a processing circuitry; and a memory, the memory containing instructions that, when executed by the processing circuitry, configure the system to:

monitor sensory input data of a plurality of industrial machines of a same type that are located within a predetermined proximity of each other, wherein monitoring the sensory input data further comprises tracking and aggregating a plurality of parameters associated with the sensory input data with respect to respective components of a plurality of components of the plurality of industrial machines, wherein the sensory input data is collected via a plurality of sensors each located in a predetermined proximity to one of the plurality of industrial machines, wherein the sensory input data is indicative of an operation of the plurality of components of the plurality of industrial machines;

analyze the plurality of parameters associated with the sensory input data using a plurality of machine learning techniques, wherein different parameters of the plurality of parameters are analyzed using different machine learning techniques of the plurality of machine learning techniques, wherein the plurality of machine learning techniques includes applying at least one of: a neural network, a recurrent neural network, decision tree learning, a Bayesian network, and clustering;

compute, based on a suspected anomalous level value of each of a plurality of suspected anomalies of the sensory input data of the plurality of industrial machines, an average anomalous amount that is associated with a time interval for each of the plurality of suspected anomalies, wherein each suspected anomaly is a portion of the sensory input data;

generate a plurality of meta-models, each meta-model being generated for one of the plurality of components, wherein the meta-model generated for each component optimally indicates anomalies in the sensory input data for the component;

determine that at least one of the plurality of suspected anomalies is an anomaly, wherein a suspected anomaly is determined to be an anomaly when a result of a subtraction of the computed average anomalous amount from the suspected anomalous level value for the at least one of the plurality of suspected anomalies exceeds a predetermined threshold, wherein each of the plurality of meta-models is utilized to detect at least a portion of the determined at least one anomaly in behavior of a respective portion of one of the plurality of industrial machines; and determine at least one predicted machine failure based on the at least one of the plurality of suspected anomalies determined to be an anomaly and the sensory input data of the plurality of industrial machines of the same type that are located within a predetermined proximity.

11. The system of claim 10, wherein the system is further configured to:
monitor a plurality of time stamped sensory input data related to the plurality of industrial machines; and
identify, in the time interval corresponding to the plurality of time stamped sensory input data, the plurality of suspected anomalies of the sensory input data.

12. The system of claim 11, wherein the identification of the plurality of suspected anomalies is achieved by unsupervised machine learning.

13. The system of claim 10, wherein the system is further configured to:
generate, upon the determination that at least one of the plurality of suspected anomalies is an anomaly, a notification that is indicative of each determined anomaly.

14. The system of claim 10, wherein the system is further configured to:
determine that at least one of the plurality of suspected anomalies is a reasonable behavior of at least one industrial machine of the plurality of industrial machines when the result of the subtraction of the average anomalous amount from each suspected anomalous level value of the plurality of sensory input data is equal to or less than the predetermined threshold.

15. The system of claim 10, wherein the sensory input data is indicative of an operation of at least one component of the plurality of industrial machines.

16. The system of claim 10, wherein the system is further configured to:
preprocess raw sensory input data received from a plurality of sensors configured to collect sensory input data based on operation of the plurality of industrial machines; and
store the preprocessed raw sensory input data in a data source.

17. The system of claim 16, wherein the preprocessing includes at least one of: data cleansing, normalization, rescaling, re-trending, reformatting, and noise filtering.

18. The method of claim 1, further comprising:
selecting at least one corrective action with respect to at least one of the plurality of industrial machines based on the at least one predicted machine failure.

* * * * *